(12) United States Patent
Stroeve et al.

(10) Patent No.: US 9,235,102 B2
(45) Date of Patent: Jan. 12, 2016

(54) APPARATUS TO MANIPULATE COLLOIDAL PARTICLES IN A BISTABLE MEDIUM

(75) Inventors: Pieter Stroeve, Davis, CA (US); Ben Shand Farber, Sonoma, CA (US); M. Saif Islam, Davis, CA (US); Edmond Edward Routhier, Sonoma, CA (US)

(73) Assignee: IDEA ZOO, INC., Santa Clara, CA (US)

( * ) Notice: Subject to any disclaimer, the term of this patent is extended or adjusted under 35 U.S.C. 154(b) by 0 days.

(21) Appl. No.: 13/817,919

(22) PCT Filed: Aug. 22, 2011

(86) PCT No.: PCT/US2011/001471
§ 371 (c)(1),
(2), (4) Date: May 14, 2013

(87) PCT Pub. No.: WO2012/023991
PCT Pub. Date: Feb. 23, 2012

(65) Prior Publication Data
US 2013/0222889 A1      Aug. 29, 2013

Related U.S. Application Data

(60) Provisional application No. 61/401,859, filed on Aug. 20, 2010.

(51) Int. Cl.
*G02B 26/00* (2006.01)
*G09G 3/34* (2006.01)
*G02F 1/23* (2006.01)
*G02F 1/09* (2006.01)
*A45D 31/00* (2006.01)

(52) U.S. Cl.
CPC ........ *G02F 1/23* (2013.01); *G02F 1/092* (2013.01); *A45D 2031/005* (2013.01); *G02F 2202/32* (2013.01)

(58) Field of Classification Search
CPC .................... G02B 26/026; G02F 2001/1678; G09G 3/344; G09F 9/372
USPC ............. 359/296; 345/107; 430/32; 204/600
See application file for complete search history.

(56) References Cited

U.S. PATENT DOCUMENTS

| 7,362,610 | B1 | 4/2008 | Salter, III et al. | |
| 8,762,548 | B1 * | 6/2014 | Kessel et al. | 709/228 |
| 2011/0141082 | A1 * | 6/2011 | Yamazaki | 345/209 |

FOREIGN PATENT DOCUMENTS

| CN | 1247625 A | 3/2000 |
| CN | 101373639 | 2/2009 |

* cited by examiner

*Primary Examiner* — William Choi
(74) *Attorney, Agent, or Firm* — Michael K. Bosworth; IPxLAW Group LLP (57) ABSTRACT

A device for manipulating colloidal particles in a bistable medium, the device includes a microcontroller, which stores a color and/or design scheme for a bistable medium, and a mechanism for changing the bistable medium from a first state to a second state.

21 Claims, 5 Drawing Sheets

APPARATUS TO MANIPULATE COLLOIDAL PARTICLES IN A BISTABLE MEDIUM

FIELD OF THE INVENTION

This invention relates to a method, apparatus, and system to manipulate colloidal particles in a bistable medium to produce a change in color to reorient and manipulate colloidal particles in a bistable medium, and more particularly to a method, apparatus, and system to manipulate colloidal particles in a bistable medium, which utilizes magnetism, electrical charge, electrical fields, light, heat, and/or any combination thereof.

BACKGROUND

Methods to achieve bistability in specified materials, for instance PCT application No. US2010/001105 discloses magnetite nanoparticles within a solid media. Through a combination of magnetic or electrical tuning and a UV reversible curing process, structures can be fixed by converting the liquid medium to a solid, which can be converted from a solid back to a liquid to change the color of the medium with the colloidal particles.

In addition, a number of inventions relating to tuning apparatuses designed to modulate frequencies of a bistable materials and/or solutions are known, including the cathode ray tube (CRT). For example, the CRT uses high-powered electromagnets to power and steer a stream of electrons, causing them to hit the television screen and make it glow.

The use of alternating magnetic fields using magnetic particles was first introduced by Gilchrist et al. (1957) to produce intratumoral heating. The tissue heating comes from magnetic friction from the magnetic particles. Advances in the field of alternating magnetic field heating of magnetic nanoparticles induced by magnetic friction, have been extensive in the last 50 years. There is an array of scientific and technological application of this phenomenon, in particular, biomedicine. Recently, superparamagnetic have been used for inducing hyperthermia in cancerous tumors. A host of different magnetic and superparamagnetic particles and nanoparticles have been identified in the literature.

Typical magnetic field amplitudes are small of order 150 Oe and frequencies are high for example 300 kHz. By using a magnet to heat superparamagnetic particles in a medium, the heating of the medium can be controlled by particle concentration, magnetic amplitude and the frequency of oscillating the magnetic field. References: Gilchrist Ric, Medal R Shorey S D et al. Ann Surgery 1957: 146:596; Jordan A Schulz R, Wust P., et al. J. Magnetism Magnetic Mater. 1999: 201:413; and DeNardo G L and DeMardo S J Cancer Biotherapy and Radiopharm. 200: 23:671

However, it would be desirable to provide a tuning apparatus designed to manipulate colloidal particles in a bistable medium to create color change and/or color design by means of applying an external magnetic or electrical field(s), electromagnetism, an electrical frequency, light, and/or pressure to the bistable material.

SUMMARY

In accordance with an exemplary embodiment, a device for manipulating colloidal particles in a bistable medium, the device comprises: a microcontroller, which stores a color and/or design scheme for a bistable medium; and a mechanism for changing the bistable medium from a first state to a second state.

In accordance with another exemplary embodiment, a method to manipulate colloidal particles in a bistable medium, comprises the steps of: providing a tuning device having at least one color scheme and/or design scheme for a bistable material; and fixing a color scheme and/or design scheme for the bistable material.

In accordance with a further exemplary embodiment, a kit to manipulate colloidal particles in a bistable medium, the kit comprises: a bistable material; and a tuning device for manipulating the bistable medium, the tuning device comprising: a microcontroller, which stores a color and/or design scheme for the bistable medium; and a mechanism for changing the bistable medium from a first state to a second state.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In accordance with an exemplary embodiment, the activation device (or tuning device) is configurable to receive downloadable software representing different colors, which allows a user to choose a specific color/design, and wherein the software tunes the device (or apparatus) and corresponding magnetic frequency to a desired bistable state and/or layer.

Figure 1:
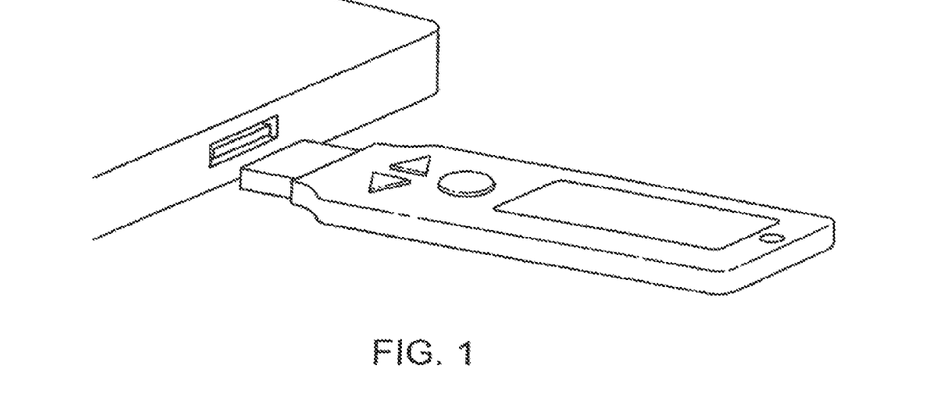
FIG. 1 is a perspective of a tuning device and computer device in accordance with an exemplary embodiment.
Figure 2:
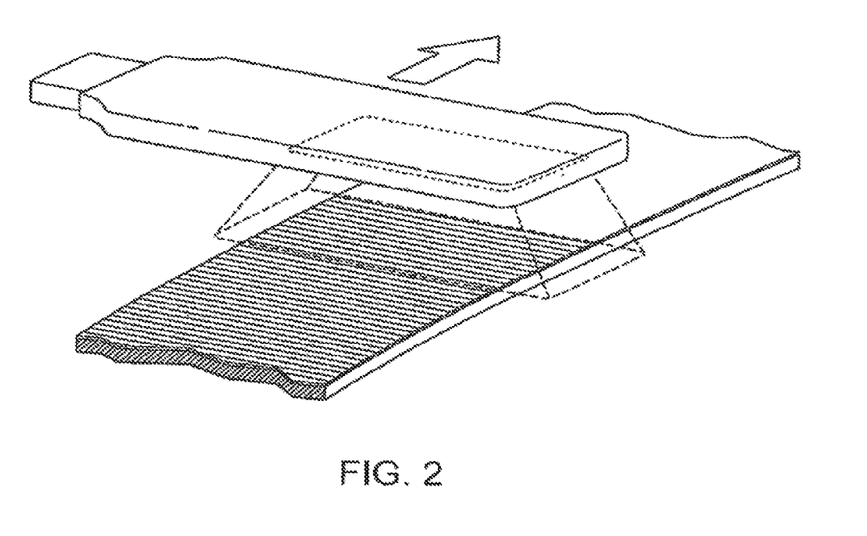
FIG. 2 is a perspective view of the tuning device having a magnetic field source during use with a bistable material in accordance with an exemplary embodiment.

FIG. 1 is an exemplary embodiment illustrating a computer application and tuning device combination. In accordance with an exemplary embodiment, the tuning device is configurable to download coded software from a computer, which changes the color and/or design scheme of a bistable material and/or layer. As shown in FIG. 1, the tuning device can be configured to be insertable into a USB port (i.e., Universal Serial Bus port) of a computer (or station) for downloading a color and/or design scheme. In accordance with an exemplary embodiment, the color and/or design scheme is preferably purchased through a website or other suitable mechanism of obtaining the desired color and/or design.

In accordance with an exemplary embodiment, the computer is preferably a computer or computer station (i.e., personal computer) having a graphical user interface (GUI) or window, which allows the user to scroll through the various colors and designs downloaded from the computer or computer station. The tuning device is shown in FIG. 1 with a USB connector, which allows the tuning device to easily connect to most computers via a USB port. However, this is not a requirement. It can be appreciated that any suitable method of inputting information into the activation or tuning device including but not limited to Bluetooth, infrared, radio frequency, and/or a magnetic charging pad as disclosed in WO 2004/038887, entitled "Improvements Relating to Automatically Configuring Rechargable Devices", can be used. The tuning device preferably includes an on/off button or switch. The on/off button or switch can also allow the user to scroll through colors/designs stored in the tuning device. An LED light(s) can indicate information such as power, charge, charge fault, low battery, and USB connection.

In accordance with another exemplary embodiment, depending on which type of bistable material is used, a variety of ways to activate the bistable material, and thus change the color of a bistable material can be implemented. For example, in accordance with an exemplary embodiment, the tuning device can use the application of an electromagnetic field (or the application of a particular field or magnetic field to a bistable material) to activate the material and change the color. As discussed herein, "bistable" means that the material is stable at two different states (e.g., voltages). For example, in accordance with an exemplary embodiment, the state of the material remains stable when there is no charge applied to the material (i.e., a first state), and during a second state, e.g. when a voltage or magnetic frequency is applied. It can be appreciated that the bistable material can be a cosmetic product such as a nail polish, a finish and/or design for toys and the like, paint, wall paint, and any other suitable application wherein the product preferably has one or more color and/or design schemes.

For example, the bistable material can be superparamagnetic iron oxide nanoparticles, as disclosed in PCT US2010/000528, PCT US2010/001105, and WO 2009/017525 A2, which are in a polymer or other media/medium. It can be appreciated that the application of certain magnetic fields to re-orientate the molecules in a bistable solution to create color change and/or color design and thus changes the way the bistable material or layer is visually perceived. It can be appreciated that since the superparamagnetic iron oxide nanoparticles normally are negatively charged, the particles can also be reoriented with an electrical field. In accordance with an exemplary embodiment, the tuning device produces and applies a magnetic or electrical quantity or effect, as current, voltage, or electromagnetic waves, to the bistable material.

In accordance with another exemplary embodiment, external effects from a device such as a portable electronic device (e.g. cellular phone, Smartphone, personal digital assistant, portable computer, etc. with an attachment) within a certain proximity to the bistable material can allow the bistable materials to change color in response to an electrical, magnetic, current, voltage and/or electromagnetic wave and/or field.

In accordance with an exemplary embodiment, a minimum magnetic field strength leads to a low density of the colloidal crystals, creating a red color, while a strong (or stronger) magnetic field strength creates high density, causing the color to change to blue. For example, consider a simultaneous magnetic assembly and UV curing process of an emulsion system comprised of superparamagnetic $Fe_3O_4$@$SiO_2$ colloidal particles, iron oxide on silica, i.e. core-shell iron oxide particles, which are self organized into ordered structures inside emulsion droplets of UV Curable resin. In accordance with another exemplary embodiment, the tuning device can tune and fix the diffraction wavelength of the superparamagnetic particles by varying the strength of magnetic fields, and spatially pattered UV light polymerizes the photocurable resin and fixes the position of ordered colloidal crystals by gradually increasing strength of magnetic field from approximately 130 Gaussian (G) to 700 Gaussian (G). In accordance with an exemplary embodiment, the magnetic intensity preferably varies from approximately 50 Gaussian (G) to 500 Gaussian (G). It can be appreciated that the tuning device can includes a preprogrammed listing of the time determined to change the intensity of the magnetic field determined to change the particles. In addition, the tuning device can be a one-time use device, which is preprogrammed with set color scheme and/or design scheme.

In accordance with an exemplary embodiment, the tuning device 100 is an electromagnetic tuning device, which includes electrical leads or magnetic poles on the on a distal end of the tuning device for easy access to the bistable material. The electrical leads (or magnetic pole) connection allows the instructions from the activation device to be transferred to the color changeable bistable material. Preferably, the electrical leads (or magnetic poles) of the color changeable bistable material will be easily accessible, so as not to be noticeable. However, this is not a requirement. Thus, all the electronic components (or magnetic components) and assemblies which provide the interface capability and power to execute the color change event are preferably a part of the invention described herein.

In accordance with an exemplary embodiment, the tuning device comprises a variety of components connected in a manner to support the primary and secondary functions of the invention. The tuning device provides the required signals and controls to activate and change the color of the bistable material. The main input to the electrical leads (or magnetic pole) is from an embedded micro-controller. The embedded micro-controller provides the necessary controls and responses to execute the input given to the controller by the user. In accordance with an exemplary embodiment, communications to the micro-controller from a host computer is via the I/O (input/output) port interface. In accordance with an exemplary embodiment, the I/O port functions as a device.

In accordance with an exemplary embodiment, the tuning device has a plurality of buttons (or switches), which provides the user with the ability to input information to the micro-controller. In accordance with an exemplary embodiment, the plurality of switches is input tack style switches (i.e., a series of 3 switches or buttons). Via the switches, the user can turn on the invention tuning device with a simple push and hold (e.g., instantaneously to approximately 1 to 3 seconds) on one of the plurality of switches (e.g., middle button). It can be appreciated that the invention can be turned off in the same or similar manner.

In accordance with an exemplary embodiment, the tuning device has three (3) or more switches (or buttons), and a top and bottom switches (or buttons) of the tuning device are used to scroll through the color palette available on the display. The micro-controller's program keeps track of the switch states at all times when the device is on. During the on state, a simple push of the middle switch will select the color desired by the user. Once selected, the micro-controller will switch the output from the display to the connection interface via an analog switch. The tuning device is now ready to manipulate the bistable material.

Other support or secondary functions of the invention include a battery, a voltage regulator, a battery charger, and status LED's. Here, in accordance with an exemplary embodiment, the middle switch and the LED are both combined as a single element. The battery is preferably a Lithium Polymer cell. However, it can be appreciated that any suitable battery or power supply can be used. For example, to provide proper charging, an I/O compatible Lithium battery charger can be used. The charger preferably contains all the necessary functions to safely charge the invention's battery in 2 hours or less. The initiation of charge and monitoring of charge state is performed by the micro-controller. When the micro-controller detects that a desired voltage (i.e., 5 volts) is available via the I/O port, it will initiate a request to the host computer for the required amount of supply current. If the request is granted, the micro-controller will initiate a charge cycle. Once the charge cycle is initiated, the micro-controller will monitor the charge regulator for and end of charge condition and charge fault condition. The available fault conditions are over temperature, under temperature, and improper battery voltage. In addition, if the desired voltage (i.e., 5 volts) is detected on the USB port, but host port connection is not established, the micro-controller will initiate charge as it is assumed the voltage available is from a passive input such as a portable wall mount supply. To provide a stable voltage to the invention's circuits, a voltage regulator is used. In accordance with an exemplary embodiment, the voltage regulator is a low drop out type. The regulator can provide a stable output voltage of 3.3V with as little as 3.5V on its input. This will enable the invention to maximize the available energy from the battery. The micro-controller will also monitor the battery voltage to detect a low battery state and alert the user. If the battery voltage drops below a specified value during the low battery state, the micro-controller will shut down all primary functions and enter the off state. The status LEDs (Light emitting diodes) will indicate to the user the state of the tuning device. The states available include, but are not limited to, are "ON", "Charge", "Charge Fault", "Low Battery", and "USB Connection".

In accordance with an exemplary embodiment, the colors and/or designs can be purchased via the Internet (i.e., online color purchase). The consumer can choose the color and/or design they wish. It is anticipated that a large variety of colors and designs will be available for download from an authorized website or source. These colors and/or designs can be downloaded directly to the tuning apparatus/device, or to another device, such as a computer, cell phone, or other electronic device, and then transferred to the activation device. In accordance with an exemplary embodiment, the tuning device will re-orient a bistable layer which will be done via direct contact between the activation device and the bistable material, or held/waved over the bistable material, or have a direct connection to the electrical leads of the bistable layer.

In accordance with another exemplary embodiment, no physical contact will be required between the tuning device and bistable material, such as when the bistable material is activated via a magnetic field. The color change may take place very quickly, and then the activation device is removed, leaving the bistable material with the desired color/design. The color/design will remain until the activation device is once again applied.

In accordance with another exemplary embodiment, the tuning device can be designed to use a localized heat source to heat the superparamagnetic particles. The use of a localized heat source, which is also known as "Hyperthermia" uses a focused hysteretic heat source to heat the magnetic nanoparticle within the bistable material with alternating magnetic frequencies (AMF). In accordance with an exemplary embodiment, the tuning device comprises an alternating magnetic frequency (AMF) coil that can be switched on an off to selectively heat the bistable material and magnetic nanoparticles therein. It can be appreciated that in accordance with an exemplary embodiment, the tuning device has an alternating magnetic field with sufficient "power" to induce the magnetic nanoparticles to heat. In addition, the amount of "power" to induce the magnetic nanoparticles to heat is dependent on the concentration of magnetic nanoparticles, which is sufficient to generate heat.

In accordance with another exemplary embodiment, by using an electromagnet both alternating and direct magnetic fields can be imposed on a sample. If the sample is a thin film, which contains superparamagnetic particles, the alternating, high frequency magnetic field is used to rapidly heat the film within seconds. By switching off the alternating magnetic field and turning on the direct magnetic field, the superparamagnetic particles can reorient in the film at the elevated temperature while the film cools.

In accordance with an exemplary embodiment, it can be appreciate that using an AMF (or AC magnetic field) that Eddy currents can be induced in conductors to oppose the change in flux that generated them. It is caused when a conductor is exposed to a changing magnetic field due to relative motion of the field source and conductor; or due to variations of the field with time. This can cause a circulating flow of electrons, or a current, within the body of the conductor. These circulating eddies of current create induced magnetic fields that oppose the change of the original magnetic field due to Lenz's law, causing repulsive or drag forces between the conductor and the magnet. The stronger the applied magnetic field, or the greater the electrical conductivity of the conductor, or the faster the field that the conductor is exposed to changes, then the greater the currents that are developed and the greater the opposing field. In addition, it can be appreciated that Eddy currents, like all electric currents, generate heat as well as electromagnetic forces.

In accordance with another exemplary embodiment, the mechanism for changing the bistable medium from a first state to a second state can be an ionizing radiation (IR) device.

In accordance with an exemplary embodiment for use with a bistable materials such as superparamagnetic iron oxide nanoparticles (i.e., colloidal particles), as disclosed in PCT US2010/000528, PCT US2010/001105, and WO 2009/017525 A2, using a reversible polymer, the tuning device heats the magnetic nanoparticles, which in turn heat the thermally reversible polymer that the magnetic particles are encapsulated within.

In accordance with another exemplary embodiment, the micro-controller preferably includes a memory for storing components oriented to changing a color scheme of a bistable material and/or layer, a processor (or central processing unit) for processing data related to the bistable material and/or layer, and a user interface for displaying data related to the bistable material and/or layer.

It can be appreciated that the tuning device can a plurality of colors/designs within its memory, thus allowing the user to change the colors as they wish. For example, the user might download five different colors into the tuning device/apparatus, and then take that activation device with them to a social event. The user might then spontaneously decide to change the color of their bistable material (e.g., nails) to one of the five they've downloaded, and do so by simply using the activation device as described above.

Figure 3A:
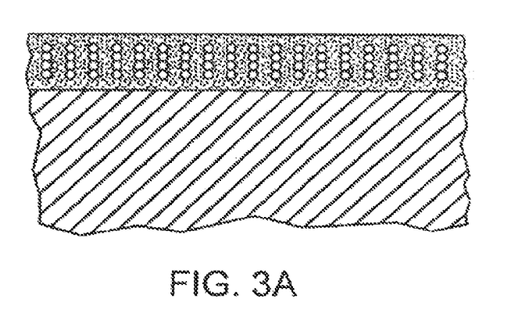
FIG. 3A is a cross-sectional view of a bistable material on a substrate or medium in a fixed first state in accordance with an exemplary embodiment.
Figure 3B:
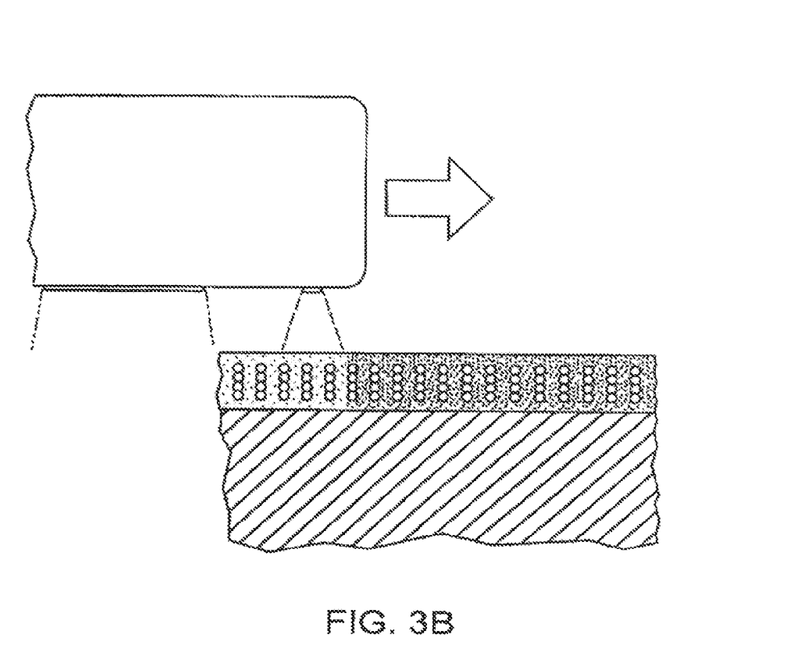
FIG. 3B is a cross-sectional view of the bistable material of FIG. 3A with a tuning device having a LED source (or heat source) and a magnetic field source during an initial movement of the tuning device over the bistable material.
Figure 3C:
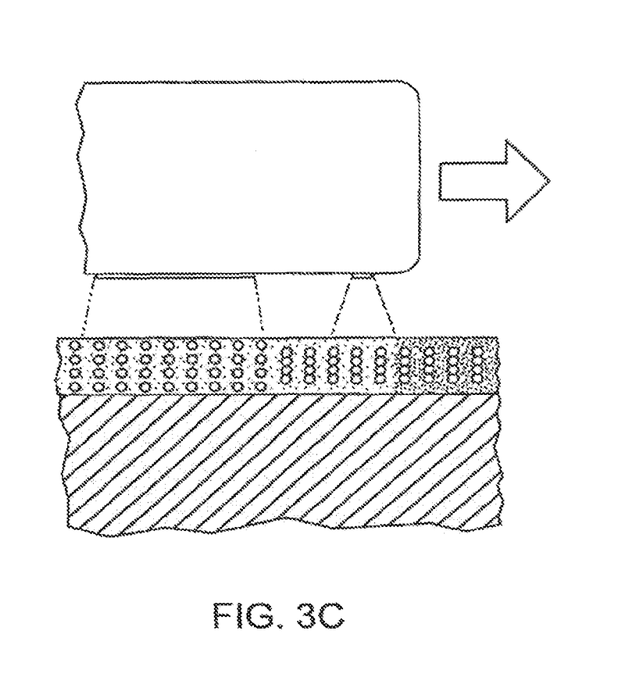
FIG. 3C is a cross-sectional view of the bistable material of FIGS. 3A and 3B, wherein the tuning device begins the process of fixing the colloidal particles within the bistable material into a second state.
Figure 3D:
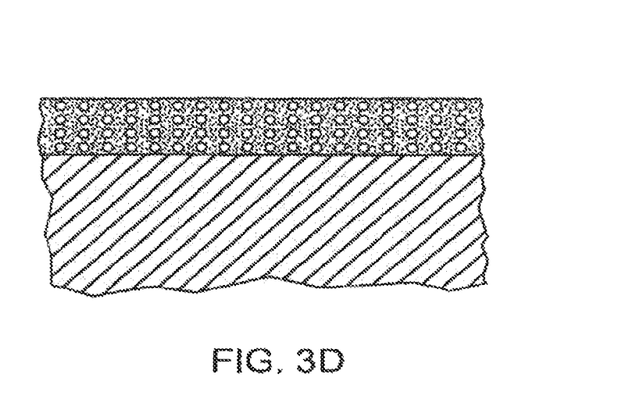
FIG. 3D is a cross-sectional view of the bistable material of FIGS. 3A-3C, wherein the colloidal particles of the bistable material are fixed in a second state.

FIG. 3A is a cross-sectional view of a bistable material on a substrate or medium in a fixed first state in accordance with an exemplary embodiment. As shown in FIG. 3B, the bistable material of FIG. 3A is exposed to a tuning device having a LED source (or heat source) and a magnetic field source during an initial movement of the tuning device over the bistable material. In FIG. 3C, the tuning device begins the process of fixing the bistable material into a second state. FIG. 3D shows the bistable material in a fixed second state.

Figure 4A:
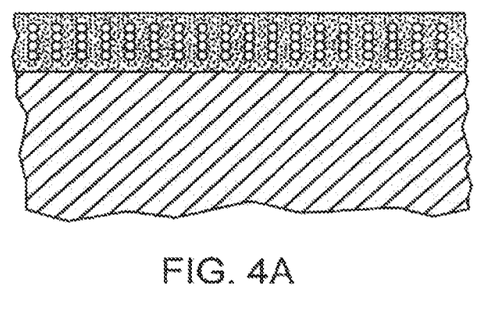
FIG. 4A is a cross-sectional view of a bistable material on a substrate or medium in a fixed first state in accordance with an exemplary embodiment.
Figure 4B:
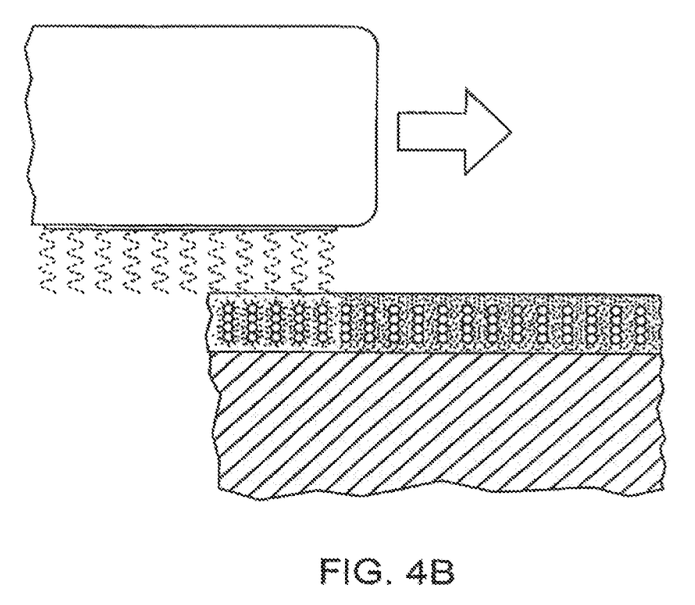
FIG. 4B is a cross-sectional view of the bistable material of FIG. 4A with a tuning device having a magnetic field source during an initial movement of the tuning device over the bistable material.
Figure 4C:
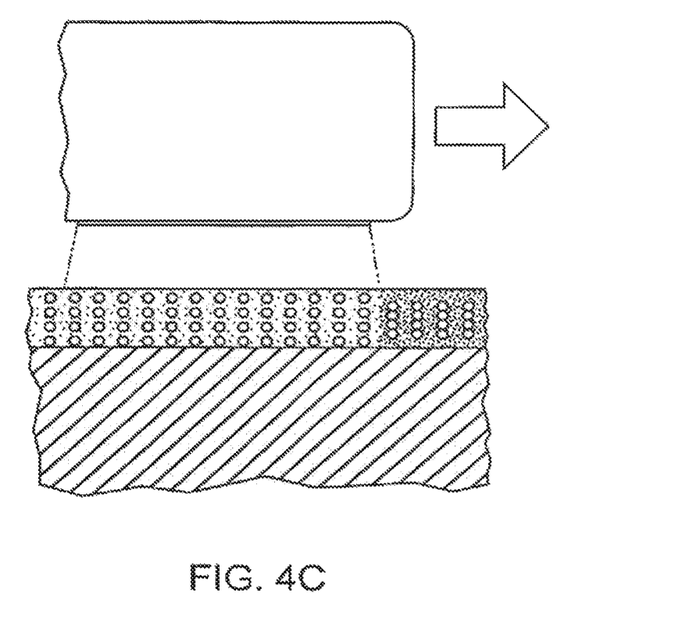
FIG. 4C is a cross-sectional view of the bistable material of FIGS. 4A and 4B, wherein the tuning device begins the process of fixing the colloidal particles within the bistable material into a second state.
Figure 4D:
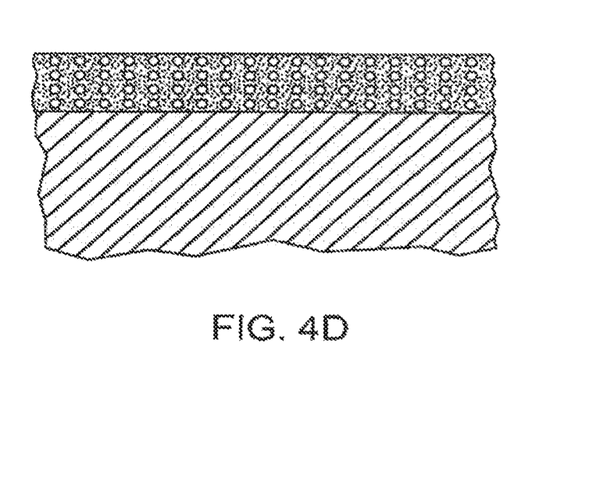
FIG. 4D is a cross-sectional view of the bistable material of FIGS. 4A-4C, wherein the colloidal particles within the bistable material are fixed in a second state.

FIG. 4A is a cross-sectional view of a bistable material on a substrate or medium in a fixed first state in accordance with an exemplary embodiment. As shown in FIG. 4B, the bistable material of FIG. 4A is exposed to a tuning device having a magnetic field source during an initial movement of the tuning device over the bistable material. In FIG. 4C, the tuning device begins the process of fixing the colloidal particles within the bistable material into a second state. FIG. 4D shows the colloidal particles within the bistable material in a fixed second state.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. A device that produces a magnetic field for manipulating colloidal particles comprising superparamagnetic iron oxide colloidal nanoparticles in a bistable medium, the device comprising:
   a microcontroller, which stores a color and/or design scheme for a bistable medium; and
   a mechanism for changing the bistable medium from a first state to a second state.

2. The device of claim 1, wherein the mechanism for changing the bistable medium from a first state to a second state is an electromagnetic device.

3. The device of claim 1, further comprising a solenoid which is placed over a substrate sized to accommodate a human fingernail.

4. The device of claim 1, further comprising an input/output port, which is configured to be placed over a substrate, which conveys at least one color scheme and/or design to the microcontroller.

5. The device of claim 1, wherein the microcontroller receives a color scheme and/or design via a wireless means.

6. The device of claim 1, wherein the mechanism for changing the bistable material from a first state to a second state is performed at between approximately 150 Gauss to 700 Gauss.

7. The device of claim 1, wherein the microcontroller comprises a memory unit, an electromagnetic tuning device and a central processing unit (CPU) which controls the magnetic field.

8. The device of claim 1, wherein the device comprises at least one button or switch, which activates the magnetic device and/or is used to scroll through the color palette available to a user.

9. The device of claim 1, wherein the mechanism to change the bistable material from a first state to a second state is an alternating magnetic frequencies (AMF) source.

10. The device of claim 1, wherein the device further includes a graphical user interface (GUI).

11. The device of claim 1, wherein the bistable material is comprised of superparamagnetic $Fe_3O_4@SiO_2$ colloidal particles.

12. The device of claim 1, further comprising a housing which contains a power supply, at least one driver to send electrical signals (and/or magnetic signals) to the magnetic device from the mechanism to change the bistable material from a first state to a second state, a clocking device, a control device to control the at least one driver, the power supply and the clocking device, and a memory unit.

13. The device of claim 1, wherein the device is multi-use magnetic device.

14. A device for manipulating colloidal particles in a bistable medium, the device comprising:
   a microcontroller, which stores a color and/or design scheme for a bistable medium;
   a mechanism for changing the bistable medium from a first state to a second state;
   wherein the mechanism to change the bistable material from a first state to a second state is an ultraviolet (UV) light emitter.

15. A method to manipulate colloidal particles comprising superparamagnetic iron oxide nanoparticles in a bistable medium, comprising:
   providing an electromagnetic tuning device having at least one color scheme and/or design scheme for a bistable material; and
   fixing a color scheme and/or design scheme for the bistable material.

16. The method of claim 15, further comprising a magnet which changes the bistable material from a first state to a second state.

17. The method of claim 15, further comprising obtaining a color scheme and/or design scheme by use of a magnetic device for the tuning device having one or more color schemes and/or design schemes.

18. The method of claim 17, wherein the step of obtaining a color scheme and/or a design scheme comprises downloading the color scheme and/or design scheme via an Internet purchase.

19. A kit to manipulate colloidal particles comprising superparamagnetic iron oxide nanoparticles in a bistable medium, the kit comprising:
   a bistable material; and
   a magnetic tuning device for manipulating the bistable medium, the tuning device comprising:
      a microcontroller, which stores a color and/or design scheme for the bistable medium; and
      a mechanism for changing the bistable medium from a first state to a second state.

20. The kit of claim 19, wherein the bistable medium is superparamagnetic $Fe_3O_4@SiO_2$ colloidal particles and the mechanism for changing the bistable material from a first state to a second state is performed at between approximately 150 Gauss to 700 Gauss.

21. The kit of claim 20, wherein the mechanism for changing the bistable medium from a first state to a second state is an electromagnetic device.

\* \* \* \* \*